(12) United States Patent
Kershaw et al.

(10) Patent No.: US 7,447,726 B2
(45) Date of Patent: Nov. 4, 2008

(54) POLYNOMIAL AND INTEGER MULTIPLICATION

(75) Inventors: Daniel Kershaw, Austin, TX (US);
Micah Rone McDaniel, Austin, TX (US)

(73) Assignee: ARM Limited, Cambridge (GB)

( * ) Notice: Subject to any disclaimer, the term of this patent is extended or adjusted under 35 U.S.C. 154(b) by 713 days.

(21) Appl. No.: 10/859,597

(22) Filed: Jun. 3, 2004

(65) Prior Publication Data

US 2005/0273485 A1     Dec. 8, 2005

(51) Int. Cl.
*G06F 7/523* (2006.01)
(52) U.S. Cl. ..................................................... 708/625
(58) Field of Classification Search ................. 708/625
See application file for complete search history.

(56) References Cited

U.S. PATENT DOCUMENTS

| 6,915,322 | B2 * | 7/2005 | Hong | 708/625 |
| 7,124,162 | B2 * | 10/2006 | Combes et al. | 708/629 |
| 7,139,787 | B2 * | 11/2006 | Rarick et al. | 708/625 |
| 7,266,579 | B2 * | 9/2007 | Dupaquis et al. | 708/620 |

OTHER PUBLICATIONS

E. Savas et al., A Scalable and Unified Multiplier Architecture for Finite Fields FDF(p) and GF($2^m$), Electrical & Computer Engineering, Oregon State University, pp. 1-20, Aug. 2000.

Lai-Sze Au et al., Unitied Radix-4 Multiplier for GF($p$) and GF($2 \wedge n$), Cardiff School of Engineering, United Kingdom Jun. 2003.

* cited by examiner

*Primary Examiner*—David H Malzahn
(74) *Attorney, Agent, or Firm*—Nixon & Vanderhye P.C.

(57) ABSTRACT

A method and apparatus for generating a plurality of concurrent significant bits forming at least a portion of a product from at least two partial products, the method comprising the following steps: for each of a plurality of said concurrent predetermined significant bits performing steps (i) to (iii): (i) performing an addition of bits of a predetermined significance from each of said plurality of partial products having a bit of said predetermined significance; (ii) forming an intermediate sum of said predetermined significance from the least significant bit of said additions; (iii) forming at least one intermediate carry of a higher significance from said higher significant bits of said sum; and detecting if said partial products are formed from integers or polynomials; and outputting said plurality of intermediate sum bits formed during steps (i) to (iii) as a plurality of product bits of corresponding significance in response to detection of polynomials; or combining said intermediate carrys and said intermediate sum bits with a same significance to produce a product bit of a corresponding significance in response to detection of integers, and outputting said combination as a plurality of product bits of corresponding significance.

10 Claims, 9 Drawing Sheets

```
Polynomial multiplication              Integer multiplication
    0 1 1 0 1 1 0                          0 1 1 0 1 1 0
    0 0 1 1 1 0 0                          0 0 1 1 1 0 0
    = = = = = = =                          = = = = = = =
              0 0 0 0 0 0 0  PP0                     0 0 0 0 0 0 0  PP0
            0 0 0 0 0 0 0    PP1                   0 0 0 0 0 0      PP1
          0 1 1 0 1 1 0      PP2                 0 1 1 0 1 1 0      PP2
        0 1 1 0 1 1 0        PP3               0 1 1 0 1 1 0        PP3
      0 1 1 0 1 1 0          PP4             0 1 1 0 1 1 0          PP4
    0 0 0 0 0 0              PP5           0 0 0 0 0 0              PP5
  0 0 0 0 0 0                PP6         0 0 0 0 0 0                PP6
  = = = = = = = = = = = = =              = = = = = = = = = = = = =
  0 0 0 1 0 0 0 0 0 1 0 0 0              0 0 1 0 1 1 1 1 0 1 0 0 0

0 0 0 0 0 0 0  PP0             0 1 1 0 1 1 0          PP3  First two 3:2s
            0 0 0 0 0 0 0    PP1           0 1 1 0 1 1 0            PP4  (80,90 FIG 4)
          0 1 1 0 1 1 0      PP2         0 0 0 0 0 0                PP5
          = = = = = = =                  = = = = = = = = = = = = =
          0 1 1 0 1 1 0 0 0  S0            0 0 1 0 1 1 1 0 1 0      S1
        0 0 0 0 0 0 0 0 0    C0          0 0 0 1 0 0 1 0 0          C1

0 1 1 0 1 1 0 0 0      S0  3:2 taking only
                                           0 0 1 0 1 1 1 0 1 0      S1  sum terms as
                                         0 0 0 0 0 0                PP6 input to generate
                                         = = = = = = = = = = = = =     poly result
                                         0 0 0 1 0 0 0 0 0 1 0 0 0  S2  (100, FIG 4)
                                         0 0 0 0 1 1 0 1 0 0 0 0    C2  S2=Polynomial
                                                                        result 0 0 0 0 0 0 0 0 0    C0  3:2 for carries
                                           0 0 0 1 0 0 1 0 0        C1  (110, FIG 4)
                                         0 0 0 0 1 1 0 1 0 0 0 0    C2
                                         = = = = = = = = = = = = =
                                         0 0 0 1 1 1 1 1 0 0 0 0    S3
                                         0 0 0 0 0 0 0 0 0 0 0      C3

0 0 0 1 0 0 0 0 0 1 0 0 0  S2  3:2 to combine
                                         0 0 0 1 1 1 1 1 0 0 0 0    S3  poly result with
                                         0 0 0 0 0 0 0 0 0 0 0      C3  other terms for
                                         = = = = = = = = = = = = =     integer result
                                         0 0 0 0 1 1 1 1 0 1 0 0 0  S4  (120, FIG 4)
                                         0 0 1 0 0 0 0 0 0 0 0 0    C4

0 0 0 0 1 1 1 1 0 1 0 0 0  S4  Final ripply carry add
                                         0 0 1 0 0 0 0 0 0 0 0 0    C4  to get interger result
                                         = = = = = = = = = = = = =     (122, FIG 4)
                                         0 0 1 0 1 1 1 1 0 1 0 0 0  S5  S5=Integer result
```

POLYNOMIAL AND INTEGER MULTIPLICATION

FIELD OF THE INVENTION

This invention relates to the field of data processing systems. More particularly, this invention relates to the field of multipliers

BACKGROUND

Multipliers for multiplying together binary numbers have been known for many years. Generally, multipliers calculate the result of a multiplication in a similar way to the performance of a long multiplication sum. That is to say a multiplier is generally formed in three stages, a partial product stage where the partial products are generated, a compression stage where they are combined and an output stage, where the product is output. FIG. 1 shows a long multiplication sum performed on two four digit numbers. As can be seen a plurality of partial products are formed 5 (partial product generation stage) and these are added (compression stage) to form the result 6 (output stage). In binary, as the digits are simply ones or zeros, then the partial products are simply formed by reproducing the multiplicand in response to a one in the multiplier and shifting it right so that its least significant bit has the same significance as the one it is produced in response to. The result of the multiplication is formed by adding the partial products.

In the compression stage, the compression of the partial products is generally done using a plurality of carry save addition logic blocks arranged, for example as a Wallace tree. A Wallace tree provides a particularly efficient way of connecting adders to perform integer multiplication. A complication arises when multiplication of different types of data needs to be performed. For example, polynomial multiplication involves the addition of partial product bits of the same significance, i.e. carries do not propagate. However, with integer multiplication a result which allows carries with a significance of n to be combined with sums of a significance of n+1 is needed. Producing a multiplier that can handle both types of data would be advantageous.

This problem was considered in the paper "A Scalable and Unified Multiplier Architecture for Finite Fields GF(p) and GF($2^m$)" by Savas et al. In this paper the problem was addressed by providing a plurality of adders in series, a control signal being sent to each adder indicating whether the carry should be allowed to propagate or whether it should be blocked. A drawback of this solution is that control signals that select between integers and polynomials need to be sent to every adder.

This problem was also considered in a paper entitled "Unified Radix-4 Multiplier for GF(p) and GF($2^n$)" by Lai et al. In this paper rather than sending control signals that select between integers and polynomials to the individual adders, the partial products themselves are modified so that the modified partial products of both polynomials and integers can be added using the same compression logic. A drawback of this is that it increases the complexity of the compression stage and it only works with a modified Booth Encoder.

SUMMARY

Viewed from one aspect the present invention provides a data processing apparatus operable to generate at least a portion of a product from a plurality of partial products, said data processing apparatus comprising: a plurality of adder logic stages each corresponding to a bit of a different predetermined significance, each of said plurality of adder logic stages being operable to receive a bit of a corresponding predetermined significance from each of said partial products having a bit of said predetermined significance, and being operable to generate an intermediate sum bit of said predetermined significance by performing an addition of said received partial product bits, said intermediate sum bit being a least significant bit of a result of said addition and to generate at least one intermediate carry; and control logic operable to receive said intermediate sum bits and said at least one intermediate carrys from each of said plurality of adder logic stages, said control logic being operable to detect if said partial products are formed from integers or polynomials, and to output said plurality of intermediate sum bits each having a different predetermined significance as a plurality of product bits of corresponding significance if polynomials are detected and to combine said intermediate carrys and said intermediate sum bits with a same significance to produce a product bit of a corresponding significance if integers are detected.

The present invention recognises that the output required for a polynomial multiplication is an exclusive OR of partial product bits having the same significance and that a standard carry save addition logic block performs an exclusive OR of the input bits from the partial product at one point during its calculation. In the prior art carry save adder however, this output is then combined with a carry from a previous stage to produce a "sum" output. This is appropriate for an integer multiplication. The present invention recognises that at one point an exclusive OR of corresponding significant bits is produced and it amends the circuit so that advantage can be taken of this if a polynomial multiplication is to be performed. Thus, a circuit where sums and carries propagate independently through the series of addition logic blocks is formed. This has the advantage that at the end a polynomial result can be simply output if polynomial multiplication is indicated. This means that the polynomial result can be produced quickly and the critical path is not affected. If an integer result is required then as the carries have propagated through by themselves, they can be combined with the sum bits at the end of the compression stage to produce an integer multiplication result.

As no special processing of the partial products is needed the control logic can be added towards the end of the compression stage which helps reduce the impact of the control signal. Furthermore, the fact that no special processing of the partial products is needed makes the apparatus suitable for Booth as well as non-Booth multipliers. It is also suitable for SIMD processing and in particular SIMD processing where the word length for parallel processed data may not always be the same. In such cases, it is particularly advantageous that calculations are performed by adding bits from the partial products of the same significance, with the carries being combined at the end. Separate addition of the bits in this way also makes it suitable for sign extended numbers as it enables the most significant bit to be treated separately and used to deal with any signs.

In some embodiments, said apparatus is operable to generate a complete product, said apparatus comprising an adder logic stage for each of said bits of said product. Thus, each bit is calculated individually by one of these adder logic stages.

In other embodiments, said product is n bits wide and said apparatus is operable to generate a complete product, said apparatus comprising n−1 adder logic stages corresponding to all but the least significant bit of said product, said apparatus being operable to output said least significant bit of said least significant one of said plurality of partial products as said least significant bit of said product.

As can be seen quite clearly from FIG. 1 the least significant bit of the least significant partial product does not need to be combined with any other values to give the least significant bit of the product. Therefore, in some embodiment no adder logic is used to calculate this bit.

Preferably, each of said plurality of adder logic stages are operable to form said at least one intermediate carry from said result of said addition shifted right by one bit such that the least significant bit is not used to form said carry.

The at least one intermediate carry is generally the next significant bit of the sum and thus simply shifting the sum right by one bit and discarding the least significant bit which is the sum output is a simple and effective way of generating the at least one intermediate carry.

In some embodiments, each of said plurality of adder logic stages is operable to form said at least one intermediate carry from the second least significant bit of said result of said addition and to form at least one further intermediate carry from a next least significant bit of said addition, said data processing apparatus being operable to combine said intermediate carrys generated by one of said adder logic stages with intermediate carrys of the same significance generated by other previous ones of said plurality of adder logic stages.

The number of bits that an addition produces depends on the number of inputs to that particular adder logic stage, thus one or more intermediate carrys may be produced depending on the number of inputs. The important thing is that carrys of the same significance are combined. These combinations are performed by the adder logic stages, the carrys being combined separately to the sums which propagate through on their own. Thus, carrys and sum propagate through independently which enables the polynomial product and the integer product to be calculated at the end in response to a single control signal.

Preferably, at least some adder logic stages are formed by a plurality of addition logic blocks each operable to generate a sum and at least one carry from a plurality of inputs, said sum being a least significant bit of an addition of said plurality of inputs and said at least one carry being at least one higher significant bit; said plurality of addition logic blocks comprising at least two addition logic blocks operable to receive bits of a predetermined significance from a plurality of said partial products and being operable to generate said intermediate sum bit of said predetermined significance; said plurality of addition logic blocks comprising at least one further addition logic block operable to receive said sums generated by said at least two of said plurality of addition blocks; and said control logic comprising an addition block operable to receive said at least one carry output from said at least two of said plurality of addition blocks.

As adder logic stages are used to sum bits of a certain significance from a plurality of partial products, many of them will require several addition logic blocks in order to perform the sum. These can be arranged in series and parallel to accommodate the addition of a large number of bits.

In some embodiments, said at least one further addition logic block is operable to receive said sums generated by said at least two addition logic blocks and at least one further bit of said predetermined significance from at least one further one of said partial products.

In some embodiments it may be practical to input some of the input bits to addition logic blocks arranged in parallel at the input side of the adder logic stage with the sum output from these first blocks and further input bits going into additional logic blocks towards the output end of the adder logic stage. This can be practical where the number of bits input is such that a large number of the addition logic blocks are required.

In some preferred embodiments, said plurality of addition logic blocks comprise three inputs, a sum output and a carry output, said at least two addition logic blocks each being operable to receive three bits of a predetermined significance from three of said partial products, and said at least one further addition logic block being operable to receive a bit of said predetermined significance from a further partial product, and said sum output of said at least two addition logic blocks, and said addition block of said control logic being operable to receive said carry output from said at least two addition logic blocks and said carry output from said at least one further addition logic blocks.

A three to two compressor is particularly well suited as an addition logic block in some embodiments of this invention. In the previously described embodiment, bits of the same significance from seven partial products are added. Six bits from six different partial products are input into two of the addition logic blocks (three into each) which are arranged in series with the sum outputs of these going to a further addition logic block along with the seventh input bit. The sum output of the further addition logic block is the relevant bit for the polynomial multiplication.

Preferably, said adder logic stages comprise logic operable to exclusive OR said received plurality of partial product bits of a same significance in order to generate said intermediate sum bit of said significance.

The sum output which is in fact the polynomial product for that bit is the exclusive OR of the input bit and thus it is advantageous to calculate it using such logic.

Preferably, said control logic comprises a plurality of AND/OR structures and at least one saturation signal, each of said AND/OR structures being operable to receive a respective one of said intermediate sum bits and one of said at least one saturation signal and, said control logic being operable to output a plurality of saturation signals or said plurality of intermediate sum bits in response to a control signal.

The separate propagation of the polynomial sum means that it is calculated in less time than it takes to calculate the integer sum. Advantage can be taken of the fact that it can be calculated in relatively few steps by including a choice between saturating the answer or producing the polynomial result in a pathway parallel to the integer pathway. The saturation step is used to saturate the answer in certain cases. Thus, a gate and a saturation signal can be added in parallel to the integer pathway and saturation of the signal can be provided without slowing the critical path. Generally, saturation is only relevant in integer multiplication, thus providing the possibility for saturation in a pathway parallel to the integer multiplication pathway is an efficient way to do it. In some embodiments there is a single saturation signal for each data lane, where in other SIMD embodiments, there may be several saturation signals.

Although, the data processing apparatus can detect if said partial products are formed from integers or polynomials in a variety of ways, preferably, said control logic is operable to receive a control signal and is operable to detect if said partial products are formed from integers or polynomials in response to said control signal. Thus, a single control signal can determine whether integer or polynomial multiplication is to be performed. Furthermore, embodiments of the invention are such that this signal can be added towards the end of the circuit and final calculations performed to produce either the integer or polynomial product as desired.

A further aspect of the present invention provides a method of generating a plurality of concurrent significant bits forming at least a portion of a product from at least two partial products comprising the following steps: for each of a plurality of said concurrent predetermined significant bits performing steps (i) to (iii): (i) performing an addition of bits of a predetermined significance from each of said plurality of partial products having a bit of said predetermined significance; (ii) forming an intermediate sum of said predetermined significance from the least significant bit of said additions; (iii) forming at least one intermediate carry of a higher significance from said higher significant bits of said sum; and detecting if said partial products are formed from integers or polynomials; and outputting said plurality of intermediate sum bits formed during steps (i) to (iii) as a plurality of product bits of corresponding significance in response to detection of polynomials; or combining said intermediate carrys and said intermediate sum bits with a same significance to produce a product bit of a corresponding significance in response to detection of integers, and outputting said combination as a plurality of product bits of corresponding significance.

The above, and other objects, features and advantages will be apparent from the following detailed description of illustrative embodiments which is to be read in connection with the accompanying drawings.

BRIEF DESCRIPTION OF THE DRAWINGS

FIG. 3 shows the combination of partial products in integer and polynomial multiplication;

FIG. 6 shows a partial product array for 16×16 multiplies;

FIG. 7 shows a partial product array for 8×8 multiplies;

DESCRIPTION OF THE PREFERRED EMBODIMENTS

Figure 1:
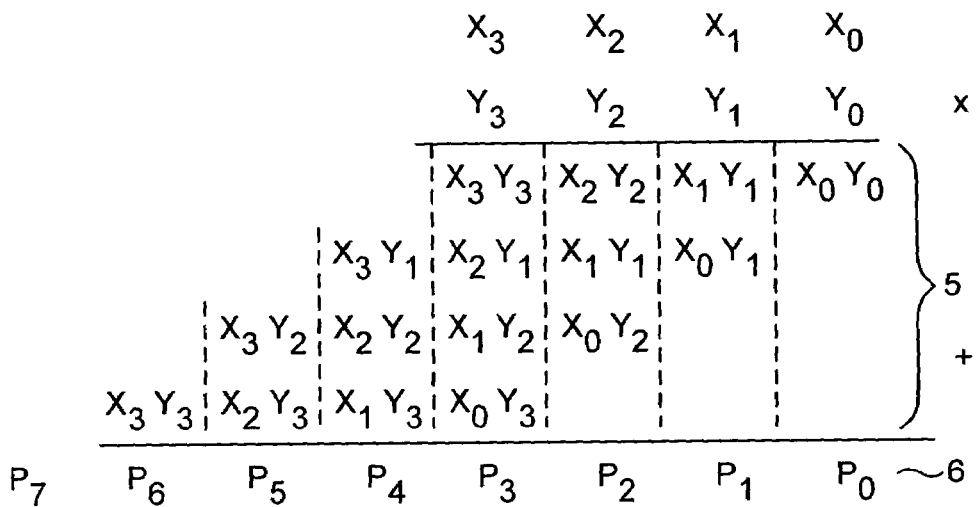
FIG. 1 shows a long multiplication sum with the partial products shown.
Figure 2:
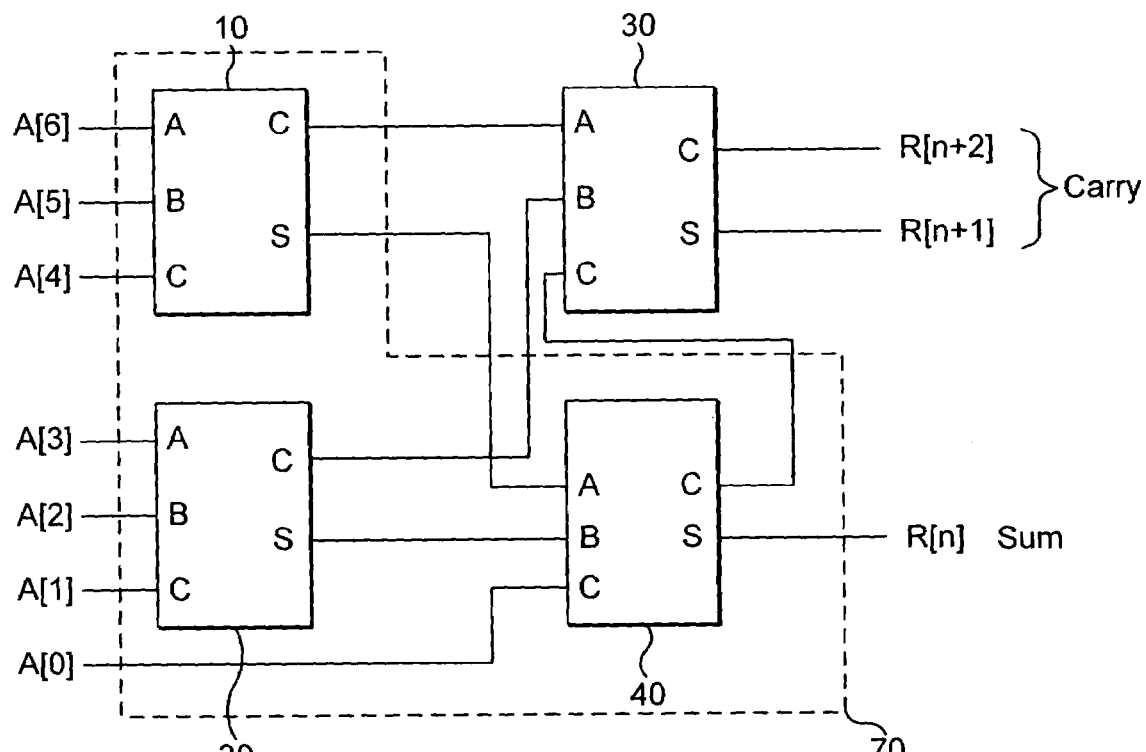
FIG. 2 shows a counter that may be used as part of a data processing apparatus according to an example embodiment.

FIG. 2 shows a counter that may be used as part of the data processing apparatus of an example embodiment. It should be noted that in this application adders, compressors, addition logic blocks, carry save adders, compression trees, adder trees, adder logic stages and counters all relate to circuits operable to add bits together to produce a sum and a carry output. This circuit illustrates a 7 to 3 compressor, wherein its seven inputs receive bits of the same significance from 7 different partial products. As can be seen the compressor consists of four separate adders 10, 20, 30 and 40. Each adder or counter has three inputs and two outputs a sum and a carry. The counters are arranged such that counter 10 and 20 each receive 3 bits from 3 different partial products and counter 40 receives the sum output of these two counters and a further bit of a further partial product. Counters 10, 20 and 40 form adder logic stage 70. Counter 30 receives carries from adder logic stage 70 and produces two carry outputs one R[n] having a significance of one greater than the sum output and the other R[n+1] two greater. As can be appreciated from this very simple figure, by combining the counters in this way, the carries and sum outputs are kept separate from each other. In other words, the carry does not at this point propagate through the sum. By arranging the circuits in this way the sums calculated for each significant bit are appropriate for output as the polynomial product. The carries from the separate counters, 10, 20 and 40 are combined by counter 30 and can be used later if an integer multiplication is required.

FIG. 3 shows polynomial multiplication and integer multiplication of two seven bit binary numbers. As can be seen seven partial products PP0 to PP6 are generated and these are then added together. Bits of the same significance are added, i.e. columns of bits are added to produce either a polynomial result S2 (where no carries are propagated) or an integer result S5, where carries do propagate.

The addition of the partial products in FIG. 3, have been partitioned into sums of three numbers each sum providing a sum output and a carry output. Thus, these individual calculations can all be performed using 3:2 compressors or counters.

A column has been shaded to show how bits of the same significance, in this case bits having a significance of 64 (from column 7), are added together to form bits of that significance as sum bits and carries.

The adding together of the partial products shown in FIG. 3 can be implemented in a 7:3 compressor, wherein 7 inputs (partial product bits) produce 3 outputs, a polynomial product S2 a sum S4 and a carry C4. These inputs are then input via a multiplexer to a full adder, such that either C4 and S4 are added to produce S5 the integer result or S2 and zero are added to produce S2 the polynomial result.

Figure 4:
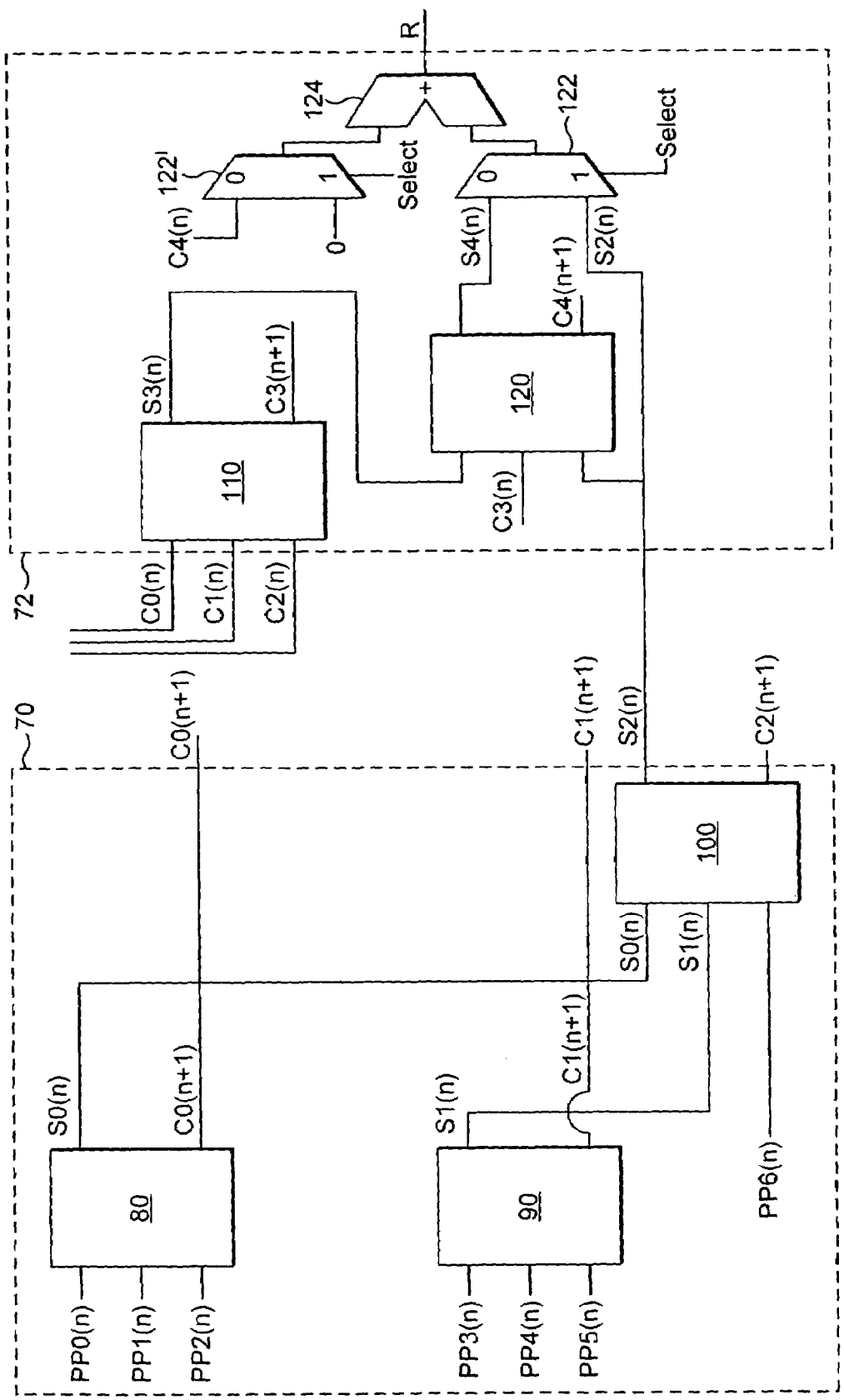
FIG. 4 shows a circuit operable to perform the addition of the nth bits of the partial products shown in FIG. 3 according to an example embodiment.

FIG. 4 shows one circuit implementation of the combining of the partial products shown in FIG. 3. In this figure the processing of a particular bit, the nth bit, is followed. In effect this can be seen as following a column, such as the shaded column in FIG. 3. FIG. 4 shows an adder logic stage 70, where the nth bit of seven partial product bits PP0(n)-PP6(n) are input and the nth bit of an intermediate sum S2(n) is generated, (this is also the polynomial result S2(n)) along with three intermediate carries C0(n+1), C1(n+1) and C2(n+1). These intermediate carries all have a significance of n+1. The adder logic stage 70 includes two 3:2 counters 80 and 90 each operable to add partial products PP0, PP1, PP2 and PP3, PP4, PP5 respectively, to produce respective sum results of significance n, S0(n) and S1(n) and carries of significance n+1C0(n+1) and C1(n+1). The sum results are then combined with the seventh partial product PP6 by a third 3:2 counter 100 to produce the polynomial result for bit n S2(n) and a carry C2 of significance n+1. In effect a 7:3 compressor is formed from several 3:2 compressors or counters.

The next section of the circuit shown in FIG. 4 is the control logic stage 72 and here intermediate carries C0(n), C1(n), C2(n) generated by an adder logic stage (not shown) similar to adder logic stage 70 but operable to calculate the n−1 polynomial result bit, are combined with the intermediate sum or polynomial result S2(n) calculated by adder logic stage 70. As can be seen a 3:2 counter 110 combines the three intermediate carries C0(n), C1(n), C2(n) to produce a sum output S3(n) and a carry output C3(n+1). The sum output S3(n) is input to a further 3:2 counter 120. Counter 120 adds the intermediate sum or polynomial result S2(n) and the sum output S3(n) of counter 110 and a carry output C3(n) from a 3:2 counter (not shown) corresponding to counter 110 which calculates the n−1th bit of the integer sum. The sum output of counter 120 S4(n) is then input to a multiplexer 122, along with the polynomial result or intermediate sum S2(n). A further multiplexer 122' arranged in parallel with multiplexer 122 receives the carry output C4(n) of a counter corresponding to counter 120 calculating the n−1th bit, and a zero input. In response to a control signal (select) on these multiplexers either S2(n) and the zero are output to the adder 124 or C4(n) and S4(n) are output. Thus, the output R of the adder is either the nth bit of the polynomial sum S2(n) or the nth bit of the integer sum S5(n).

An AND/OR structure is provided in some embodiments (see for example FIG. 9, in this case shown as a multiplexer) to combine the polynomial result with a saturation signal. This takes advantage of the fact that the sum signal relevant for polynomial multiplication is propagated separately and in fewer steps than integer multiplication. Inserting the saturation logic in the pathway here enables saturation to be selected rather than polynomial multiplication where required without slowing the critical path. In this embodiment saturation is triggered by a saturation signal on the AND/OR structure 160. Thus, if saturation is required a saturation signal is output by AND/OR structure 160 rather than a polynomial result. Saturation is generally not required in polynomial multiplication. One example of where saturation may be needed is in signed fractional multiplication where the binary point is fixed just beyond the most significant bit, and −1 is to be multiplied by −1. In this case saturation is required to provide an answer approximating to 1, i.e. all value bits should be set to one and the signed bit set to 0. Thus, the AND/OR structure requires OR gates for the value bits with a 1 saturation signal and an AND gate for the signed bit with a 0 saturation signal. It should be noted that integer multiplication includes multiplication of fractions where the binary bit is in a fixed position.

A preferred embodiment of the multiplier is described below.

The integer multiply unit according to an embodiment of the present invention supports a range of SIMD multiply operations. Below table shows the supported integer data types and their supported multiply operations.

TABLE 1

Multiply Operations

| Data type | Saturating | Doubling | Rounding | Long Result (size * 2) | Long result >> size |
|---|---|---|---|---|---|
| Signed 8 bit | No | No | No | Yes | No |
| Unsigned 8 bit | No | No | No | Yes | No |
| Polynomial 8 bit | No | No | No | Yes | No |
| Signed 16 bit | Yes | Yes | Yes | Yes | Yes |
| Unsigned 16 bit | No | No | No | Yes | No |
| Signed 32 bit | Yes | Yes | Yes | Yes | Yes |
| Unsigned 32 bit | No | No | No | Yes | No |

Below table lists all of the instructions executed by the integer multiply pipe and their required operations.

TABLE 2

Multiply Instructions

| Instruction | Saturating | Doubling | Rounding | Long Result (size * 2) | Take High half of result? |
|---|---|---|---|---|---|
| VMUL | No | No | No | Yes | No |
| VMLA | No | No | No | Yes | No |
| VMLS | No | No | No | Yes | No |

TABLE 2-continued

Multiply Instructions

| Instruction | Saturating | Doubling | Rounding | Long Result (size * 2) | Take High half of result? |
|---|---|---|---|---|---|
| VQDMLH | Yes | Yes | No | No | Yes |
| VQRDMLH | Yes | Yes | Yes | No | Yes |
| VQDMUL | Yes | Yes | No | Yes | No |
| VQDMLA | Yes | Yes | No | Yes | No |
| VQDMLS | Yes | Yes | No | Yes | No |

The integer multiplier (NM) unit is implemented as 2 32×16 multiply arrays. Each array is capable of performing two 16×16 operations or four 8×8 operations in a single pass. Each array can also be used to perform a 32×16 operation, allowing 32×32 operations in two passes. This means the NIM is capable of performing eight lanes of 8×8 operations or four lanes of 16×16 operations in a single pass, and two lanes of 32×32 operations in two passes.

Theory

The NIM consists of two 32×16 multiply arrays that can each handle four 8×8 operations, two 16×16 operations, or a single 32×16 operation in a single pass.

Two 16×16 Multiplies using a Single 32×16 Array

Figure 5:
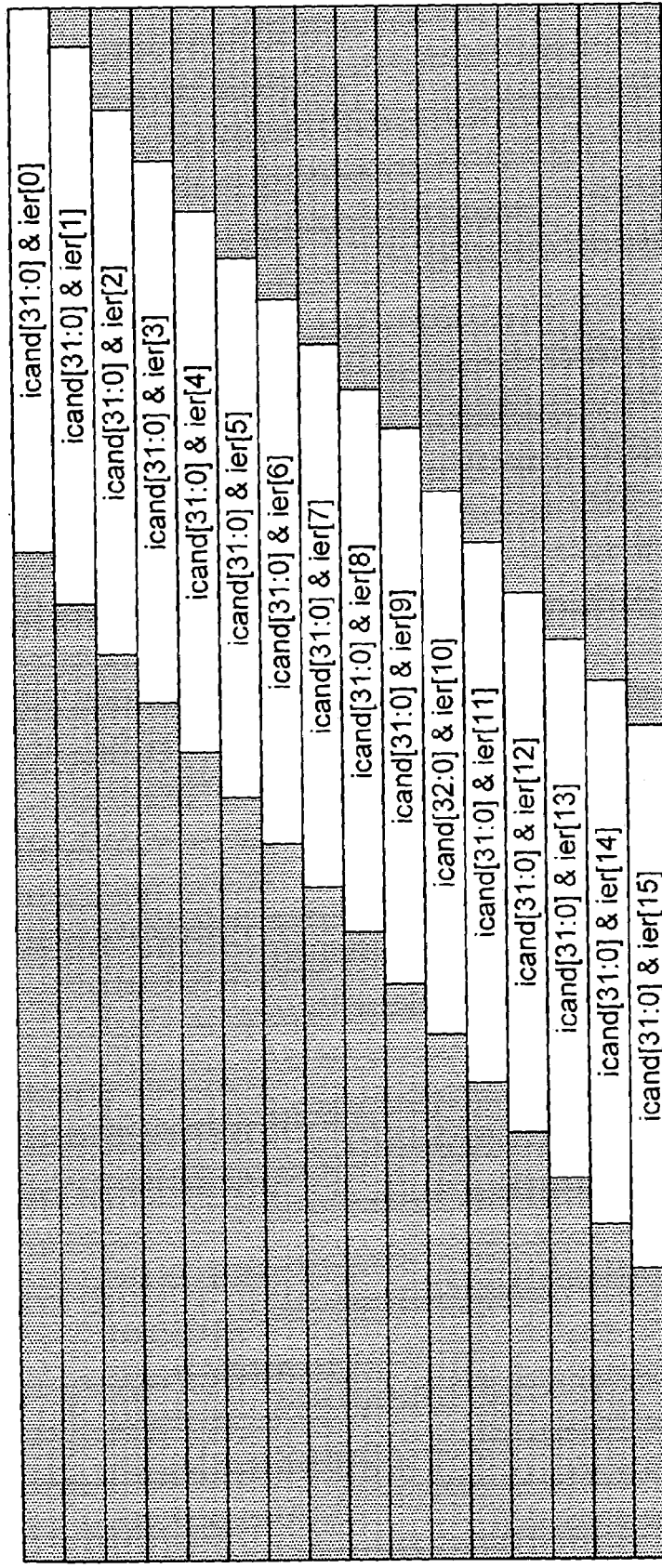
FIG. 5 shows a partial product array for 32×16 multiply.
Figure 6:
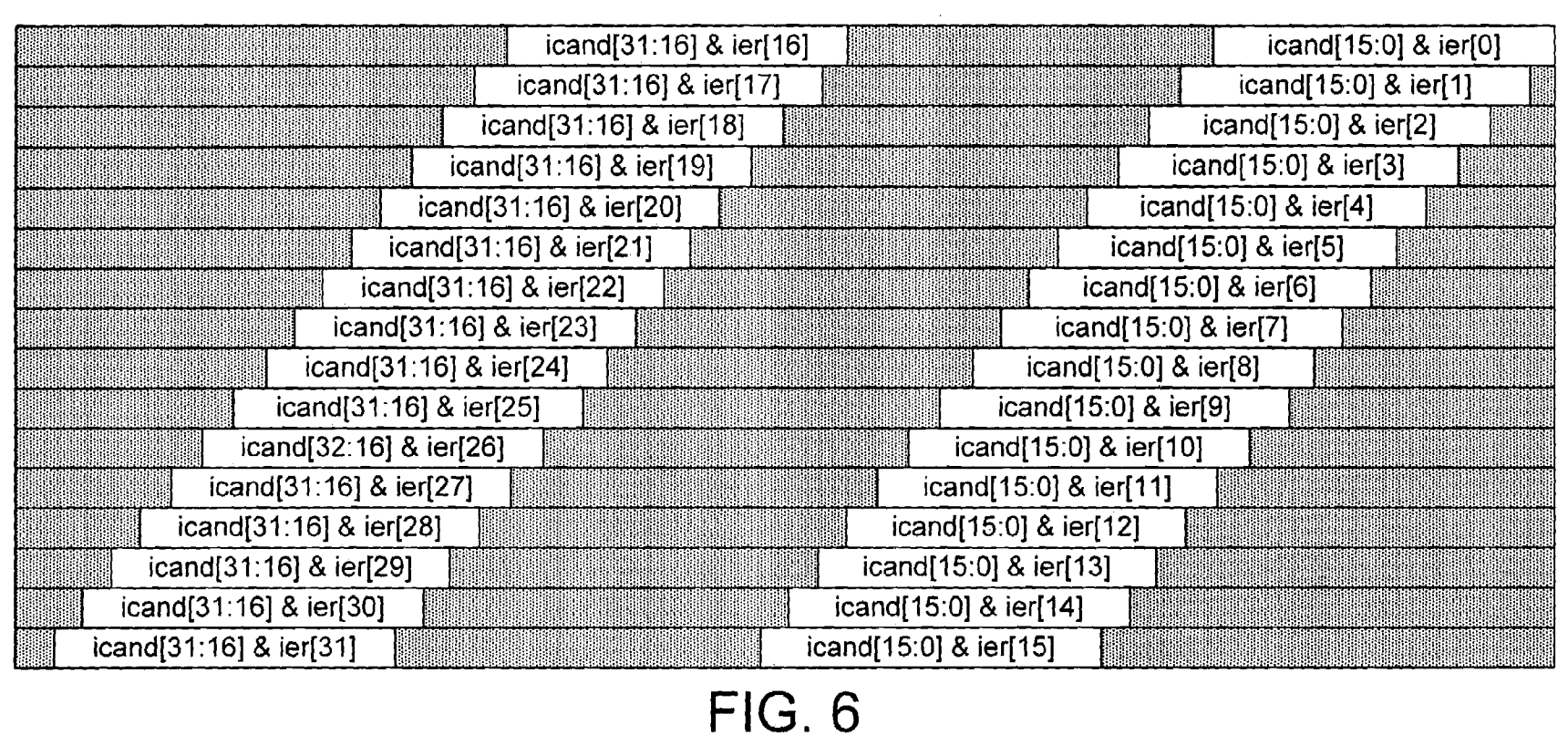

For a normal unsigned 16×16 multiply the partial product array is shown in FIG. 5. The grey regions are all zero. For 8×8 multiplies, the appropriate regions are zeroed, allowing a single 16×16 array to perform two 8×8s at a time. The partial products are shown in FIG. 6.

Four 8×8 Multiplies using a 32×16 Array

Figure 7:
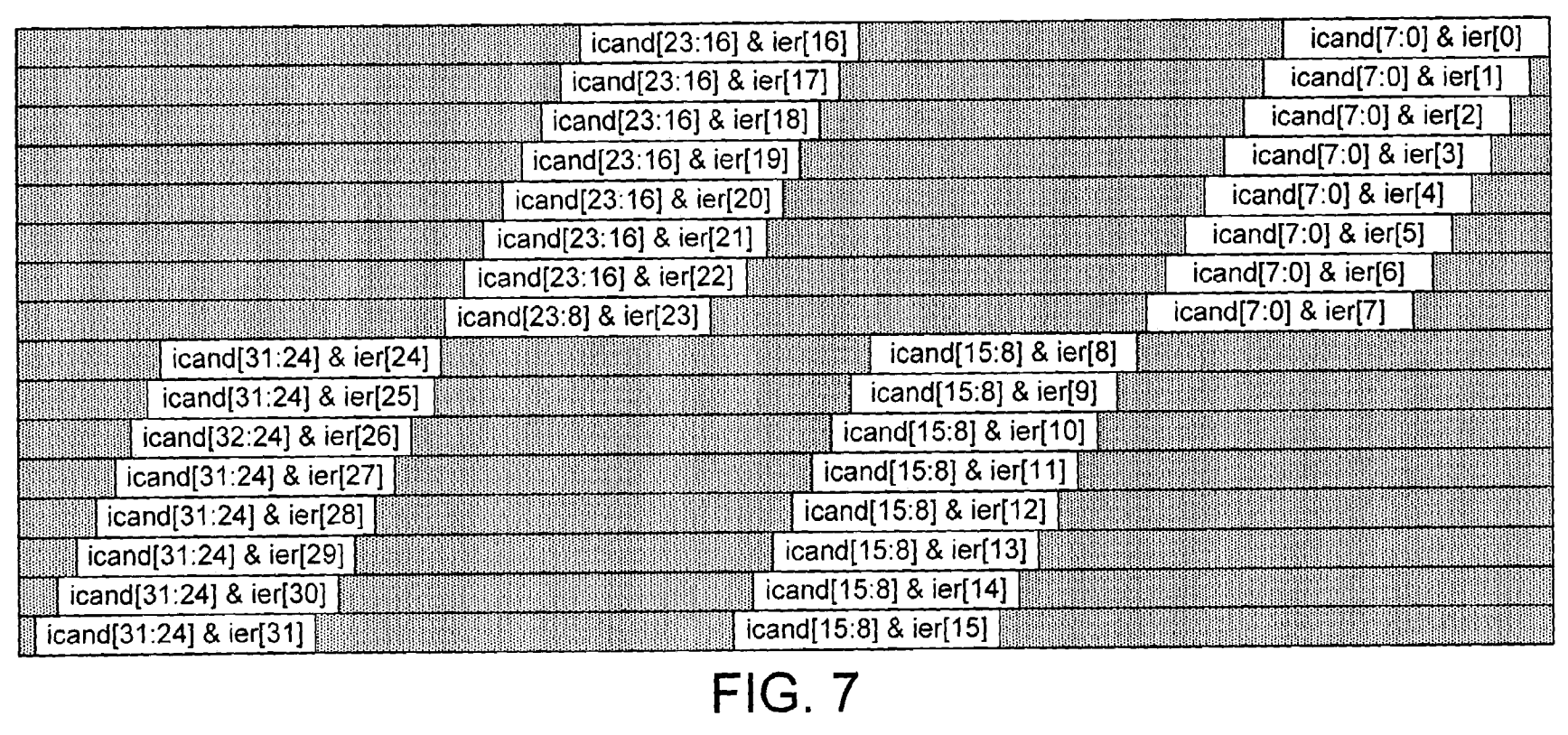

Two 16×16 arrays can also be used together to perform a 32×16 multiply. The partial product arrays for the lower and upper 16×16 arrays (LSB and MSB, respectively) are shown in FIG. 7. The grey areas are again all zero. By treating the 2 32-bit partial product arrays as a single 64-bit array, the 32×16 operation is performed.

To perform a 32×32 multiply then, two passes are necessary. On the first pass, Multiplicand[31:0]×Multiplier[15:0] is performed. On the second pass, Multiplicand[31:0]×Multiplier[31:16] is performed, and must be shifted left by 16 bits to be added to the result of the first pass in the accumulator. The 16 bit shift is performed in MUL2.

32×32 Multiply in Two Passes using a 32×16 Array

To perform a 32×32 multiply, two passes are required. On the first pass, multiplicand[31:0]×multiplier[15:0] is performed. On the second pass, multiplicand[31:0]×multiplier[31:16] is performed. The result of pass 2 is shifted left by 16 and added to the result from pass 1 (in the accumulator) to obtain the final result.

Signed Multiplies

This implementation handles signed multiplies by realizing that for 2's complement signed numbers, the binary representation can be thought of as having a negative most significant bit, with the rest of the bits representing a positive quantity. For example, in 4-bit binary representation, 5 is $0101=0*2^3+1*2^2+0*2^1+1*2^0$. −5 represented by the 2's complement, $\sim(0101)+1=1011=-1*2^3+0*2^2+1*2^1+1*2^0$. So for signed multiplies the most significant partial product is negated, with other partial products unchanged.

Figure 8:
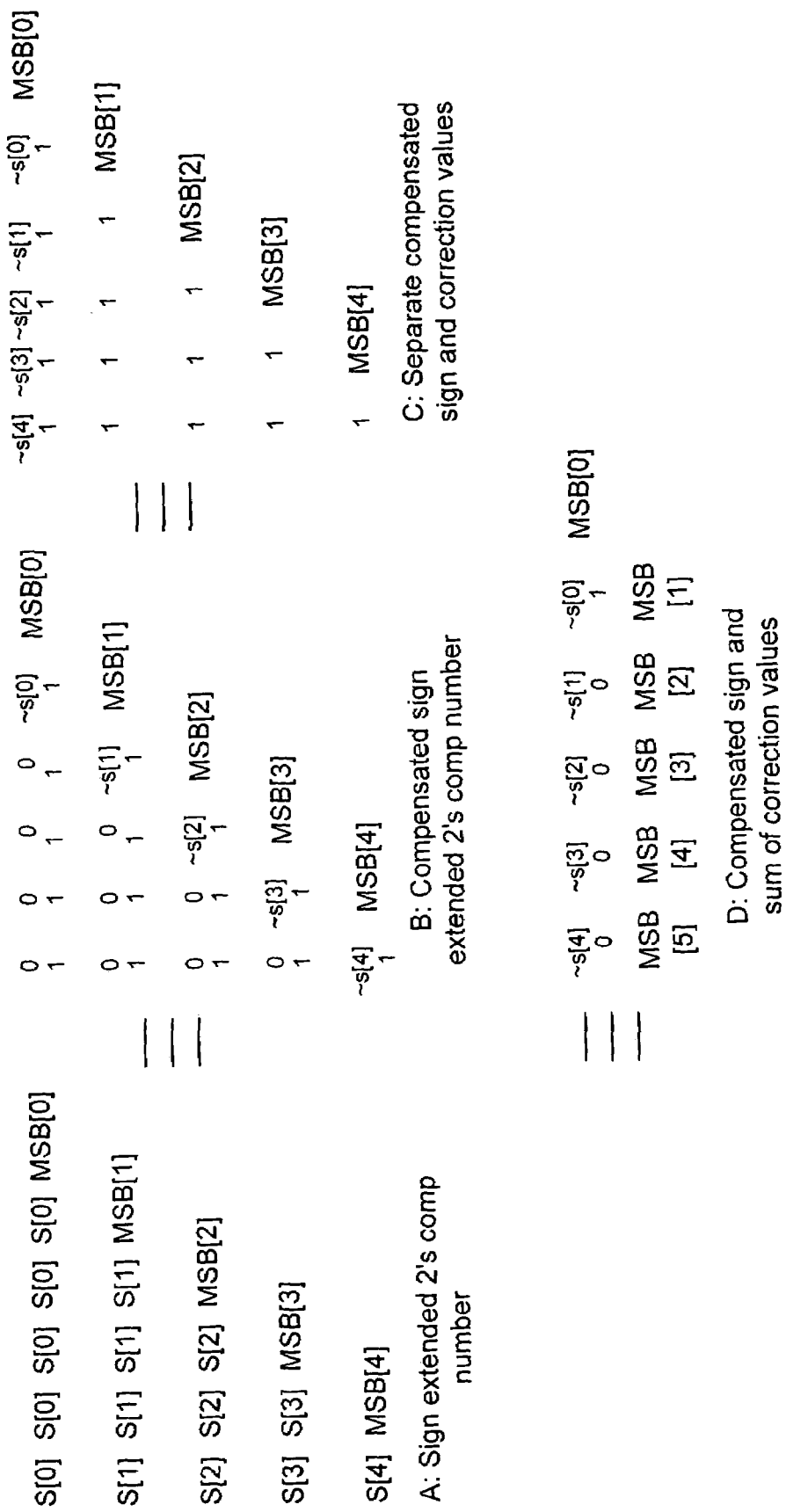
FIG. 8 shows a sign extension of partial products for signed multiplies.

For a signed multiplicand, the partial products must also be sign extended. Rather than significantly increasing the load on the multiplicand's MSB, sign extension is handled as in FIG. 8.

Negation of Result

For VMLS operations, the multiplier result must be negated before being sent to the accumulator. At the end of MUL2, we have Result=PPS+PPC. So −Result=−PPS−PPC=~PPS+~PPS+2. To avoid having to add the 2, we make use of the fact that −a=~a+1=~(a−1). We want partial products e and f such that −Result=~e+~f. We can find e and f in terms of PPS and PPC:

$$-\text{Result}=\sim e+\sim f=-PPS-PPC$$

$$-e-1-f-1=-PPS-PPC, \text{ because } \sim e=-e-1$$

$$e+f=PPS+PPC-2$$

So by adding −2 into the partial product compression tree, we only have to invert the two partial product outputs.

Saturation Detection

The only case where saturation can occur during the multiply itself (as opposed to during the accumulate) is for saturating doubling multiplies (these are always signed) when the operands are both −1(1<<size<td>). So logic is implemented in this case to force the result to saturate to the maximum positive value ((1<<size<td>)−1).

Polynomial Result

Polynomial data types are defined such that each bit is thought of as a coefficient in a polynomial of degree size<td>. Adds and multiply operations for this data type are defined in table 3.

TABLE 3

Truth Table for Polynomial Add and Multiply

| a | b | A + b | a*b |
|---|---|-------|-----|
| 0 | 0 | 0 | 0 |
| 0 | 1 | 1 | 0 |
| 1 | 0 | 1 | 0 |
| 1 | 1 | 0 | 1 |

So for this data type, a+b=a xor b; a*b=a and b. Thus we can generate the partial products just as for unsigned multiplies. All that remains is to extract the exclusive OR of all the partial products from the compression tree. This is done with no additional logic by grouping the sum results from the carry-sum pairs together at, each stage. The mux at the end of MUL2 selects the polyniomial result when appropriate.

Pipeline Stages

Figure 9:
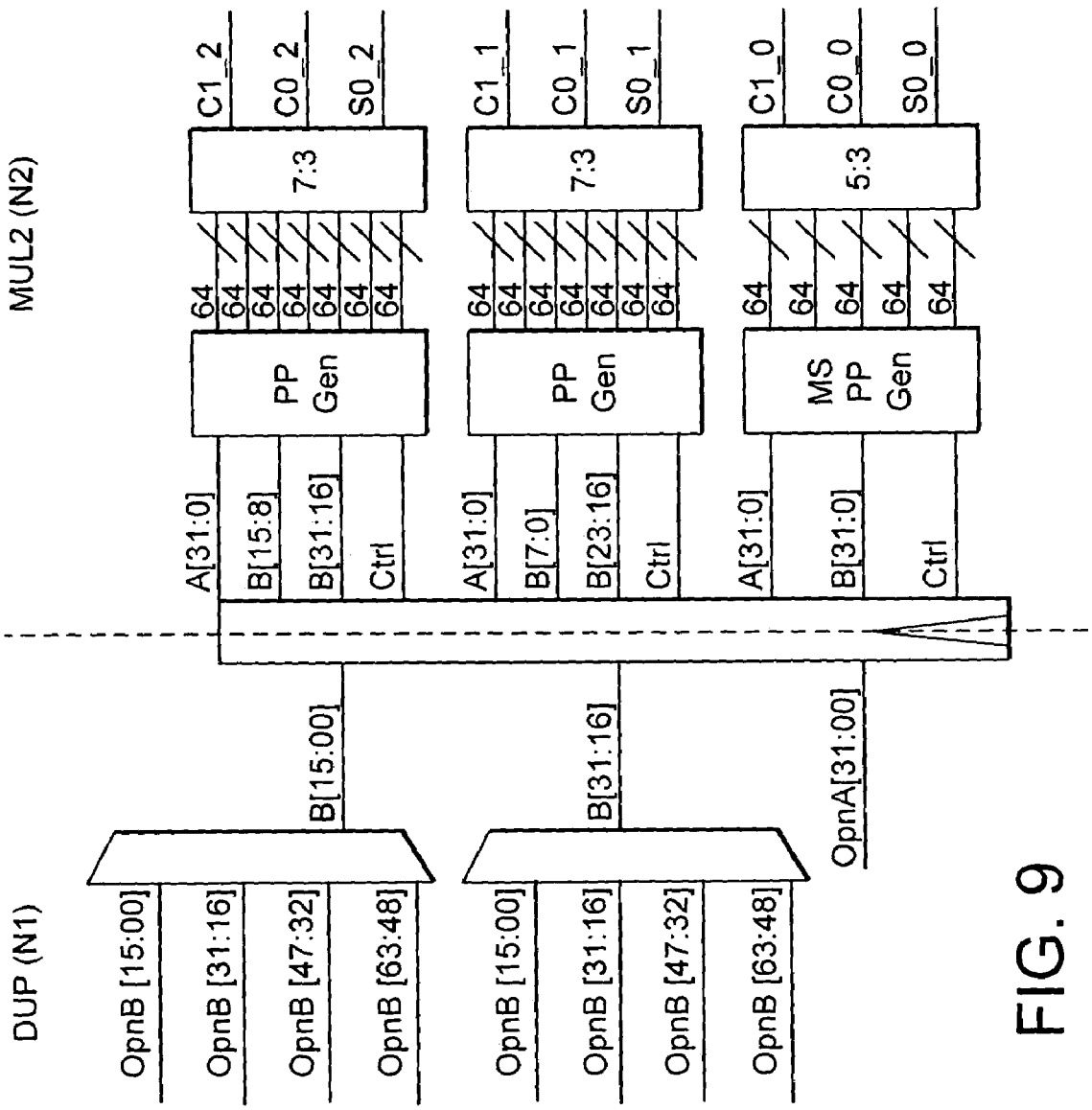
FIG. 9 shows an integer multiply pipeline schematic according to an example embodiment.
Figure 9:
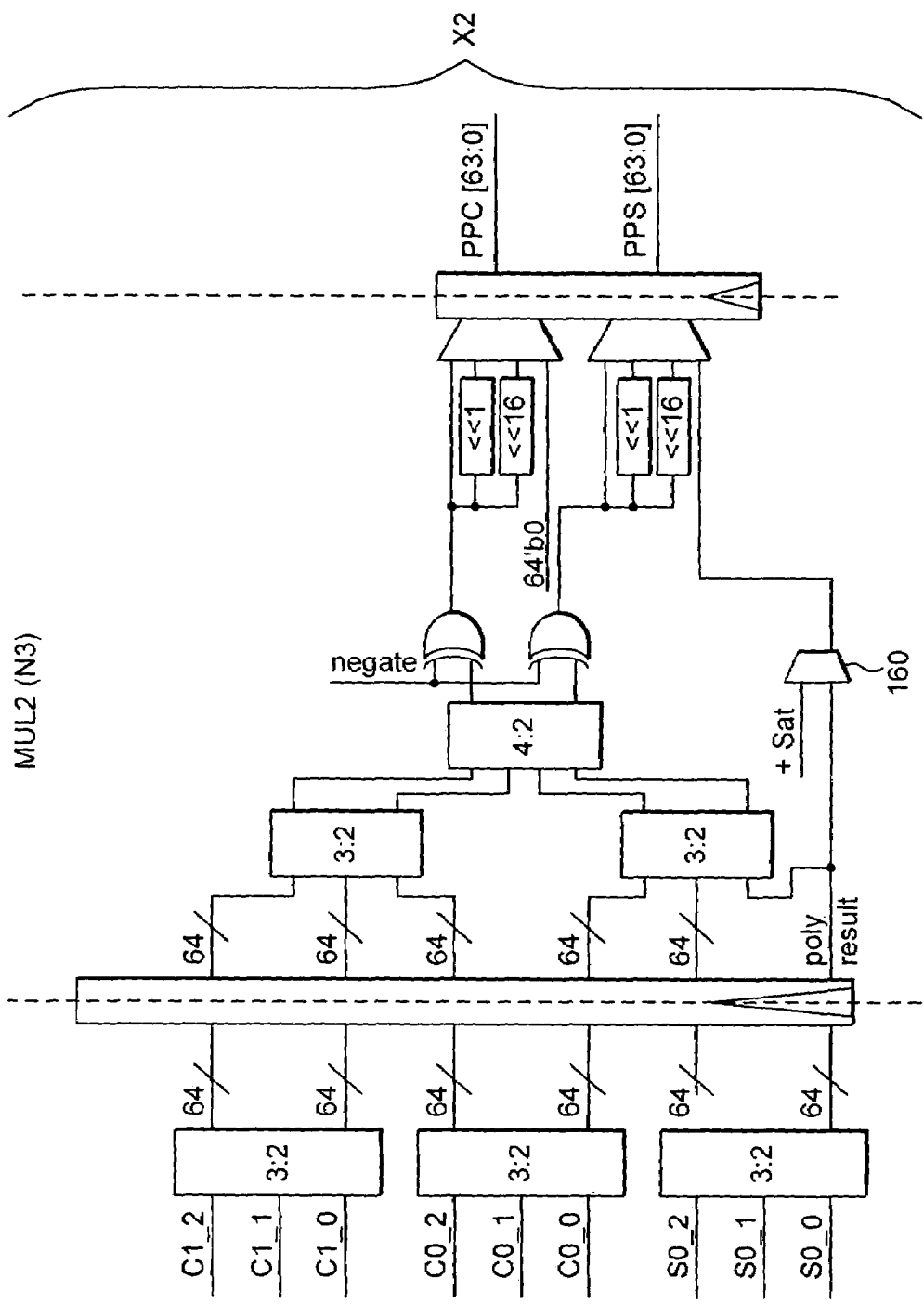

The pipeline is divided into three stages: DUP (N1), MUL1 (N2), and MUL2 (N3). FIG. 9 is a schematic of the entire pipeline. The following sections will describe each stage of the pipeline in more detail.

DUP (N1)

The DUP pipe stage performs two jobs, it selects the appropriate value of the multiplier for scalar operations (and 32-bit operations), and generates the controls for partial product generation in MUL1. These functions are described more thoroughly below.

Duplicate

The two register reads (OpnA[63:0], OpnB[63:0]) for the multiply stage are latched at the beginning of N1. For vector by scalar operations, we need to have the multiplier (A[63:0]) filled in with the correct byte, half-word, or word from OpnA. Since the scalar data type can be 8,16 or 32 bit, any byte of OpnA[63:0] may end up as any byte of A[63:0]. OpnB is never treated as a scalar, and thus doesn't require any muxing in this stage.

Since an 8-to-1 mux does not require a full cycle, the forwarding muxes for OpnA and OpnB for this pipe can be located near the register file, with routing to the multiply pipe taking place in N1. The controls for the 8 8-to-1 muxes can either be produced directly in instruction decode (would require routing 24 control bits) or can be generated in N1 from more basic control signals.

Partial Product Generation Controls

To relieve the critical path in MUL1, the control signals for generating the partial products are generated here. The necessary logic to generate the controls is described in the following sections.

MUL1 (N2)

Generation of Partial Products 0-6 and 8-14

Partial products 0-6 and 8-14 are generated in a straightforward way. For a normal 16×16 unsigned multiply, you would have:

$$PP0[31:0]=\{32\{B[0]\}\} \ \& \ \{16'h0000, A[15:0]\}$$

$$PP1[31:0]=\{32\{B[1]\}\} \ \& \ \{15'h0000, A[15:0], 1'b0\}$$

.

.

.

Since we are doing 8-bit, 16-bit and 32-bit multiplies with the same hardware, the enable term (A[i]) is a little more complex.

Table 4 gives the expressions for the enables and the data inputs for partial products 0-6 and 8-14. The logic for the enables is placed in the DUP stage, so that the path in MUL is:

$$PPX[i]=\text{enable} \ \& \ \text{data}[i]$$

TABLE 4

Enables and Data for Partial Products 0-6 and 8-14

| Bits | Enable | Data |
|------|--------|------|
| For 0 <= X <= 6 | | |
| ppX[07 + X:00 + X] | B[X] | A[07:00] |
| ppX[15 + X:08 + X] | B[X] & ~is8bit | A[15:08] |
| ppX[31 + X:16 + X] | B[X] & is32bit | A[31:16] |
| ppX [39 + X:32 + X] | B[X + 16] & ~is32bit | A[23:16] |
| ppX[47 + X:40 + X] | B[X + 16] & is16bit | A[31:24] |
| All other bits of ppX[63:0] | 1'b1 | 1'b0 |
| For 8 <= X <= 14 | | |
| ppX[07 + X:00 + X] | B[X] & ~is8bit | A[07:00] |
| ppX[15 + X:08 + X] | B[X] | A[15:08] |
| ppX[31 + X:16 + X] | B[X] & is32bit | A[31:16] |
| ppX [39 + X:32 + X] | B[X + 16] & is16bit | A[23:16] |
| ppX[47 + X:40 + X] | B[X + 16] & ~is32bit | A[31:24] |
| All other bits of ppX[63:0] | 1'b1 | 1'b0 |

Generation of Special Partial Products

To take care of signed multiplies, we handle pp07 and pp15 separately. In fact, it is necessary to split each of these into two partial products. In addition, another term is added to negate the result when necessary (for VMLS, VQDMLS), leaving five "special" partial products:

PPA—a sparsely populated partial product which holds the "carry ins" required for twos complement representation of the negative of both the multiplier and multiplicand, as required for signed multiplications. PPA also holds the constant, which needs to be added for sign extension of the multiplicand.

PPB—used to hold the sign extension of the multiplicand for signed multiplications, which actually turns out to be the inverse of the multiplicand.

PPC—holds partial product seven (pp7) of the multiplication. For signed 8*8 multiplies, this value is negated so that it may be subtracted from the main multiplier result. For unsigned and all other multiplier sizes—this value is not negated.

PPD—holds the partial product fifteen (pp15) of the multiplication. For signed multiplies, this value is negated so that it may be subtracted from the main multiplier result. For unsigned multiplies, this value is not negated PPE—holds value to be added to negate the result—0 unless instruction is VMLS or VQDMLS Since the data input for these partial products may be different for different cases, the critical path for these will look like:

$$PPX[i]=(DataA\&SelA)|(DataB\&SelB)$$

so a 3-to-1 mux instead of an AND gate. Hopefully the timing is similar. Table shows the value of SelA, DataA, SelB, and DataB for all of the bits of the special partial products.

TABLE 5

Special Partial Products A, B, C, and D

```
//ppa - carry bit for negating MSPP, sign compensation of MSB of MSPP
assign ppa[ 63] = opa_n2_q[31] & imac_signed_n2_q;
assign ppa[62:57] = {6{opa_n2_q[31] & imac_signed_n2_q & sel32_n2_q}};
assign ppa[ 56] = opa_n2_q[31] & imac_signed_n2_q & sel8_n2_q;
assign ppa[ 55] = (opb_n2_q[31] & imac_signed_n2_q & sel8_n2_q) |
    (opa_n2_q[31] & imac_signed_n2_q & sel32_n2_q);
assign ppa[54:49] = {6{opa_n2_q[31] & imac_signed_n2_q & sel32_n2_q}};
assign ppa[ 48] = (opa_n2_q[31] & imac_signed_n2_q & ~sel8_n2_q);
assign ppa[ 47] = (opb_n2_q[31] & imac_signed_n2_q & sel16_n2_q) |
    (opa_n2_q[23] & imac_signed_n2_q & sel8_n2_q) |
    (opa_n2_q[31] & imac_signed_n2_q & sel32_n2_q);
assign ppa[46:41] = 6'b00_0000;
assign ppa[ 40] = opa_n2_q[23] & imac_signed_n2_q & sel8_n2_q;
assign ppa[ 39] = opb_n2_q[23] & imac_signed_n2_q & sel8_n2_q;
assign ppa[38:33] = 6'b00_0000;
assign ppa[ 32] = opa_n2_q[31] & imac_signed_n2_q & sel32_n2_q;
assign ppa[ 31] = opa_n2_q[15] & imac_signed_n2_q & ~sel32_n2_q;
assign ppa[30:25] = 6'b00_0000;
assign ppa[ 24] = opa_n2_q[15] & imac_signed_n2_q & sel8_n2_q;
assign ppa[ 23] = opb_n2_q[15] & imac_signed_n2_q & sel8_n2_q;
assign ppa[22:17] = 6'b00_0000;
assign ppa[ 16] = opa_n2_q[15] & imac_signed_n2_q & sel16_n2_q;
assign ppa[ 15] = (opb_n2_q[15] & imac_signed_n2_q & ~sel8_n2_q) |
    (opa_n2_q[07] & imac_signed_n2_q & sel8_n2_q);
assign ppa[14:09] = 6'b00_0000;
assign ppa[ 08] = opa_n2_q[07] & imac_signed_n2_q & sel8_n2_q;
assign ppa[ 07] = opb_n2_q[07] & imac_signed_n2_q & sel8_n2_q;
assign ppa[06:00] = 7'b000_0000;
// ppb - sign compensation for imac_signed_n2_q multiplies
assign ppb[ 63] = opb_n2_q[31] & ~opa_n2_q[31] & imac_signed_n2_q &
    ~sel32_n2_q;
assign ppb[62:56] = ~opb_n2_q[30:24] & {7{opa_n2_q[31] & imac_signed_n2_q &
    ~sel32_n2_q}};
assign ppb[55:48] = ~opb_n2_q[23:16] & {8{opa_n2_q[31] & imac_signed_n2_q &
    sel16_n2_q}};
assign ppb[ 47] = (opb_n2_q[15] & ~opa_n2_q[31] & imac_signed_n2_q &
    sel32_n2_q) |
    (opb_n2_q[23] & ~opa_n2_q[23] & imac_signed_n2_q &
    sel8_n2_q);
assign ppb[46:40] = (~opb_n2_q[22:16] & {7{opa_n2_q[23] & imac_signed_n2_q &
    sel8_n2_q}}) |
    (~opb_n2_q[14:08] & {7{opa_n2_q[31] & imac_signed_n2_q &
    sel32_n2_q}});
assign ppb[ 39] = opb_n2_q[07] & ~opa_n2_q[31] & imac_signed_n2_q & sel32_n2_q;
assign ppb[38:32] = ~opb_n2_q[06:00] & {7{opa_n2_q[31] & imac_signed_n2_q &
    sel32_n2_q}};
assign ppb[ 31] = opb_n2_q[15] & ~opa_n2_q[15] & imac_signed_n2_q &
    ~sel32_n2_q;
assign ppb[30:24] = ~opb_n2_q[14:08] & {7{opa_n2_q[15] & imac_signed_n2_q &
    ~sel32_n2_q}};
assign ppb[23:16] = ~opb_n2_q[07:00] & {8{opa_n2_q[15] & imac_signed_n2_q &
    sel16_n2_q}};
assign ppb[ 15] = opb_n2_q[07] & ~opa_n2_q[07] & imac_signed_n2_q & sel8_n2_q;
assign ppb[14:08] = ~opb_n2_q[06:00] & {7{opa_n2_q[07] & imac_signed_n2_q &
    sel8_n2_q}};
assign ppb[07:00] = 8'b0000_0000;
// ppc - holds partial product 7
assign ppc[63:55] = 9'b0_0000_0000;
```

TABLE 5-continued

Special Partial Products A, B, C, and D assign ppc[54:47] = ( opa_n2_q[31:24] & {8{opb_n2_q[23] & sel16_n2_q}});
assign ppc[46:39] = ( opa_n2_q[23:16] & {8{opb_n2_q[23] & sel16_n2_q}}) |
    ( opa_n2_q[23:16] & {8{opb_n2_q[23] & sel8_n2_q &
        ~imac_signed_n2_q}}) |
    (~opa_n2_q[23:16] & {8{opb_n2_q[23] & imac_signed_n2_q &
        sel8_n2_q}});
assign ppc[38:23] = ( opa_n2_q[31:16] & {16{opb_n2_q[07] & sel32_n2_q}});
assign ppc[22:15] = ( opa_n2_q[15:08] & {8{opb_n2_q[07] & ~sel8_n2_q}});
assign ppc[14:07] = ( opa_n2_q[07:00] & {8{opb_n2_q[07] & ~imac_signed_n2_q}}) |
    ( opa_n2_q[07:00] & {8{opb_n2_q[07] & imac_signed_n2_q &
        ~sel8_n2_q}}) |
    (~opa_n2_q[07:00] & {8{opb_n2_q[07] & imac_signed_n2_q &
        sel8_n2_q}});
assign ppc[06:00] = 7'b000_0000;
// ppd - holds partial product 15
assign ppd[63] = 1'b0;
assign ppd[62:55] = ( opa_n2_q[31:24] & {8{opb_n2_q[31] & ~imac_signed_n2_q &
        ~sel32_n2_q}}) |
    (~opa_n2_q[31:24] & {8{opb_n2_q[31] & imac_signed_n2_q &
        ~sel32_n2_q}});
assign ppd[54:47] = ( opa_n2_q[23:16] & {8{opb_n2_q[31] & ~imac_signed_n2_q &
        sel16_n2_q}}) |
    (~opa_n2_q[23:16] & {8{opb_n2_q[31] & imac_signed_n2_q &
        sel16_n2_q}});
assign ppd[46:31] = ( opa_n2_q[31:16] & {16{opb_n2_q[15] & ~imac_signed_n2_q &
        sel32_n2_q}}) |
    (~opa_n2_q[31:16] & {16{opb_n2_q[15] & imac_signed_n2_q &
        sel32_n2_q}});
assign ppd[30:23] = ( opa_n2_q[15:08] & {8{opb_n2_q[15] & ~imac_signed_n2_q}}) |
    (~opa_n2_q[15:08] & {8{opb_n2_q[15] & imac_signed_n2_q}});
assign ppd[22:15] = ( opa_n2_q[07:00] & {8{opb_n2_q[15] & ~imac_signed_n2_q &
        ~sel8_n2_q}}) |
    (~opa_n2_q[07:00] & {8{opb_n2_q[15] & imac_signed_n2_q &
        ~sel8_n2_q}});
assign ppd[14:00] = 15'b000_0000_0000_0000;
// ppe - for VMLS, VQDMLS
assign ppe[63:48] = (16'hFFFE & {16{imac_negate_n2_q & sel8_n2_q}}) |
    (16'hFFFF & {16{imac_negate_n2_q & ~sel8_n2_q}});
assign ppe[47:32] = (16'hFFFE & {16{imac_negate_n2_q & ~sel32_n2_q}}) |
    (16'hFFFF & {16{imac_negate_n2_q & sel32_n2_q}});
assign ppe[31:16] = (16'hFFFE & {16{imac_negate_n2_q & sel8_n2_q}}) |
    (16'hFFFF & {16{imac_negate_n2_q & ~sel8_n2_q}});
assign ppe[15:00] = (16'hFFFE & {16{imac_negate_n2_q}});

Compression Tree

Once the partial products are generated. All that remains is to implement an 19:2 compression tree. In MUL1, the 19 partial products are compressed to 6 in two stages:
  two 7:3 counters and a 5:3 counter take 19 partial products to 9
  three 3:2 counters take 9 partial products to 6

Also, in order to generate the polynomial result, the sum outputs of the two 7:3 counters and the 5:3 counter are grouped together into one of the 3:2 counters. The sum output of that 3:2 counter is the polynomial result.

MUL2 (N3)

MUL2 performs the remaining partial product compression and manipulates the final result as necessary.

Compression Tree

All that remains is to compress 6 partial products down to 2. This can be done with a two 3:2 counters followed by a 4:2 counter.

Inversion of Partial Products

For VMLS and VQDMLS, the two partial products must be inverted to complete the negation of the final result.

Manipulation of Result

A multiplexer is provided at the end of MUL2 to select one of the following:

PPS and PPC—normal case

PPS<<1 and PPC<<1—for doubling multiplies

PPS<<16 and PPC<<16—for the second pass of 32×32 multiplies poly result and 0—for polynomial multiplies saturated result and 0—for the one special case where saturation can occur The polynomial result and saturated result are available early and can therefore be muxed together before the final mux in some embodiments thereby decreasing the width of the final mux, allowing it to be a mux-flop.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A data processing apparatus operable to generate at least a portion of a product from a plurality of partial products, said data processing apparatus comprising:

a plurality of adder logic stages each corresponding to a bit of a different predetermined significance, each of said plurality of adder logic stages being operable to receive a bit of a corresponding predetermined significance from each of said partial products having a bit of said predetermined significance, and being operable to generate an intermediate sum bit of said predetermined significance by performing an addition of said received partial product bits, said intermediate sum bit being a least significant bit of a result of said addition and to generate at least one intermediate carry; and control logic operable to receive said intermediate sum bits and said at least one intermediate carrys from each of said plurality of adder logic stages, said control logic being operable to detect if said partial products are formed from integers or polynomials, and to output said plurality of intermediate sum bits each having a different predetermined significance as a plurality of product bits of corresponding significance if polynomials are detected and to combine said intermediate carrys and said intermediate sum bits with a same significance to produce a product bit of a corresponding significance if integers are detected, wherein said control logic comprises a plurality of AND/OR structures and at least one saturation signal, each of said AND/OR structures being operable to receive a respective one of said intermediate sum bits and said at least one saturation signal and, said control logic being operable to output a plurality of saturation signals or said plurality of intermediate sum bits in response to a control signal.

2. A data processing apparatus according to claim 1, said apparatus being operable to generate a complete product, said apparatus comprising an adder logic stage for each of said bits of said product.

3. A data processing apparatus according to claim 1, wherein said product is n bits wide and said apparatus is operable to generate a complete product, said apparatus comprising n−1 adder logic stages corresponding to all but the least significant bit of said product, said apparatus being operable to output said least significant bit of said least significant one of said plurality of partial products as said least significant bit of said product.

4. A data processing apparatus according to claim 1, wherein each of said plurality of adder logic stages are operable to form said at least one intermediate carry from said result of said addition shifted right by one bit such that said least significant bit is not used to form said carry.

5. A data processing apparatus according to claim 4, wherein each of said plurality of adder logic stages is operable to form said at least one intermediate carry from a second least significant bit of said result of said addition and to form at least one further intermediate carry from a next least significant bit of said addition, said data processing apparatus being operable to combine said intermediate carrys generated by one of said adder logic stage with intermediate carrys of the same significance generated by other previous ones of said plurality of adder logic stages.

6. A data processing apparatus according to claim 1, wherein at least some adder logic stages are formed by a plurality of addition logic blocks each operable to generate a sum and at least one carry from a plurality of inputs, said sum being a least significant bit of an addition of said plurality of inputs and said at least one carry being at least one higher significant bit;

said plurality of addition logic blocks comprising at least two addition logic blocks operable to receive bits of a predetermined significance from a plurality of said partial products;

said plurality of addition logic blocks comprising at least one further addition logic block operable to receive said sums generated by said at least two of said plurality of addition block and being operable to generate said intermediate sum bit of said predetermined significance; and said control logic comprising an addition block operable to receive said at least one carry output from said at least two of said plurality of addition blocks.

7. A data processing apparatus according to claim 6, wherein said at least one further addition logic block is operable to receive said sums generated by said at least two addition logic blocks and at least one further bit of said predetermined significance from at least one further one of said partial products.

8. A data processing apparatus according to claim 7, wherein said plurality of addition logic blocks comprise three inputs, a sum output and a carry output, said at least two addition logic blocks each being operable to receive three bits of a predetermined significance from three of said partial products, and said at least one further addition logic block being operable to receive a bit of said predetermined significance from a further partial product, and said sum output of said at least two addition logic blocks, and said addition block of said control logic being operable to receive said carry output from said at least two addition logic blocks and said carry output from said at least one further addition logic blocks.

9. A data processing apparatus according to claim 1, wherein said adder logic stages comprise logic operable to exclusive OR said received plurality of partial product bits of a same significance in order to generate said intermediate sum bit of said significance.

10. A data processing apparatus according to claim 1, wherein said control logic is operable to receive a control signal and is operable to detect if said partial products are formed from integers or polynomials in response to said control signal.

* * * * *